(12) United States Patent
Ho et al.

(10) Patent No.: US 9,886,075 B2
(45) Date of Patent: Feb. 6, 2018

(54) THREE-WAY HANDSHAKING METHOD AND COMPUTER READABLE MEDIA

(71) Applicant: Realtek Semiconductor Corp., HsinChu (TW)

(72) Inventors: Hsuan-Ting Ho, Taichung (TW); Liang-Wei Huang, Hsinchu (TW); Heng Cheong Lao, Hsinchu (TW); Ta-Chin Tseng, New Taipei (TW)

(73) Assignee: Realtek Semiconductor Corp., HsinChu (TW)

( * ) Notice: Subject to any disclaimer, the term of this patent is extended or adjusted under 35 U.S.C. 154(b) by 0 days.

(21) Appl. No.: 14/967,377

(22) Filed: Dec. 14, 2015

(65) Prior Publication Data

US 2016/0259393 A1 Sep. 8, 2016

(30) Foreign Application Priority Data

Mar. 4, 2015 (TW) .............................. 104106878 A

(51) Int. Cl.
| | |
|---|---|
| *G06F 1/32* | (2006.01) |
| *G06F 13/42* | (2006.01) |
| *G06F 1/26* | (2006.01) |
| *G06F 13/40* | (2006.01) |

(52) U.S. Cl.
CPC ............ *G06F 1/3209* (2013.01); *G06F 1/266* (2013.01); *G06F 1/3253* (2013.01); *G06F 13/42* (2013.01); *G06F 13/40* (2013.01); *Y02B 60/1235* (2013.01)

(58) Field of Classification Search
CPC ........ G06F 1/3209; G06F 13/40; G06F 13/42; H04L 67/12
See application file for complete search history.

(56) References Cited

U.S. PATENT DOCUMENTS

| | | | | | |
|---|---|---|---|---|---|
| 5,870,428 | A | * | 2/1999 | Miller | ..................... H04L 1/241 370/249 |
| 7,813,324 | B1 | * | 10/2010 | Goel | ....................... H04L 1/004 370/336 |
| 2013/0051435 | A1 | * | 2/2013 | Van De Maele | ....... H04L 12/12 375/211 |
| 2014/0119381 | A1 | * | 5/2014 | Diab | ........................ H04L 12/40 370/431 |
| 2014/0208152 | A1 | * | 7/2014 | Magoshi | ................. H04L 67/00 714/4.1 |

(Continued)

OTHER PUBLICATIONS

Gunter Sporer, Solving Challenges in the Development of a True Automotive Ethernet Physical Interface, May 26, 2014.*

(Continued)

*Primary Examiner* — Henry Tsai
*Assistant Examiner* — Christopher A Daley
(74) *Attorney, Agent, or Firm* — Winston Hsu

(57) ABSTRACT

A three-way handshaking method includes: controlling a first port in a first specific mode to send a first specific signal to a second port, and controlling the first port to enter a second specific mode; when the first port receives a second specific signal, determining the second port is in the second specific mode and controlling the first port to send a third specific signal to the second port; and when it is determined that the second port is in a third specific mode, controlling the first port to enter the third specific mode.

15 Claims, 5 Drawing Sheets

(56) References Cited

U.S. PATENT DOCUMENTS

2015/0026372 A1* 1/2015 Laichinger .......... G06F 13/4004
710/105
2015/0267692 A1* 9/2015 Yamamoto .......... F04B 27/1804
417/218
2016/0132455 A1* 5/2016 Ho ........................ G06F 1/3296
710/105

OTHER PUBLICATIONS

Dr. Ali Abaye, Ph.D. Broadr-Reach Technology: Enabling One Pair Ethernet, 2012.*
Thomas Suermann, Advance Sleep and Wakeup concept for Automotive Ethernet, Sep. 2013.*
Broadcom Corporation, BroadR-Reach Physical Layer Transceiver Specification for Automotive Applications, V3.0, May 7, 2014.*

* cited by examiner

THREE-WAY HANDSHAKING METHOD AND COMPUTER READABLE MEDIA

BACKGROUND OF THE INVENTION

1. Field of the Invention

The disclosed embodiments of the present invention relate to a three-way handshaking method, and more particularly, to a three-way handshaking method for sending a sleep request applied in an automotive Ethernet standard, and computer readable media.

2. Description of the Prior Art

The auto industry regards Ethernet as the mainstream of automotive internet architecture for a new generation. Ethernet has a high bandwidth which can satisfy applications such as new driver assistant and information entertainment systems.

The auto industry has strict requirements related to flexibility to expand, low manufacturing costs, low power consumption and durability. Automotive Ethernet standards (e.g. BR-PHY standard), however, do not restrict actively sending a request to ask a link partner to enter a sleep mode, which results in power consumption issues. Therefore, an innovative method is desired for providing automotive Ethernet associated functions to improve this power consumption issue.

SUMMARY OF THE INVENTION

One of the objectives of the present invention is to provide a three-way handshaking method for sending a sleep request applied in an automotive Ethernet standard, and associated computer readable media.

According to a first exemplary embodiment of the present invention, a three-way handshaking method is disclosed. The method comprises: controlling a first port in a first specific mode to send a first specific signal to a second port, and controlling the first port to enter a second specific mode; determining the second port is in the second specific mode when the first port receives a second specific signal, and controlling the first port to send a third specific signal to the second port; and controlling the first port to enter a third specific mode when determining the second port is in the third specific mode.

According to a second exemplary embodiment of the present invention, a three-way handshaking method is disclosed. The method comprises: determining a first port has entered a second specific mode when a second port which is in a first specific mode receives a first specific signal sent by the first port, and controlling the second port to enter the second specific mode and send a second specific signal; and controlling the second port to enter a third specific mode when the second port receives a third specific signal.

According to a third exemplary embodiment of the present invention, a computer readable media is disclosed. The computer readable media stores a program code, which executes the following steps when the program code is executed by a processor: controlling a first port in a first specific mode to send a first specific signal to a second port, and controlling the first port to enter a second specific mode; determining whether the second port is also in the second specific mode when the first port receives a second specific signal, and controlling the first port to send a third specific signal to the second port; and controlling the first port to enter a third specific mode when determining the second port is in the third specific mode.

According to a fourth exemplary embodiment of the present invention, a computer readable media is disclosed. The computer readable media sores a program code, which executes the following steps when the program code is executed by a processor: determining a first port has entered a second specific mode when a second port which is in a first specific mode receives a first specific signal sent by the first port, and controlling the second port to enter the second specific mode too and send a second specific signal; and controlling the second port to enter a third specific mode when the second port receives a third specific signal.

The operating mode finite state machine of the present invention can correspond to the automotive Ethernet standard, and provides a flexible method for entering into sleep mode to improve the power consumption issues of the automotive Ethernet standard.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should not be interpreted as a close-ended term such as "consist of". Also, the term "couple" is intended to mean either an indirect or direct electrical connection. Accordingly, if one device is coupled to another device, that connection may be through a direct electrical connection, or through an indirect electrical connection via other devices and connections.

Figure 1:
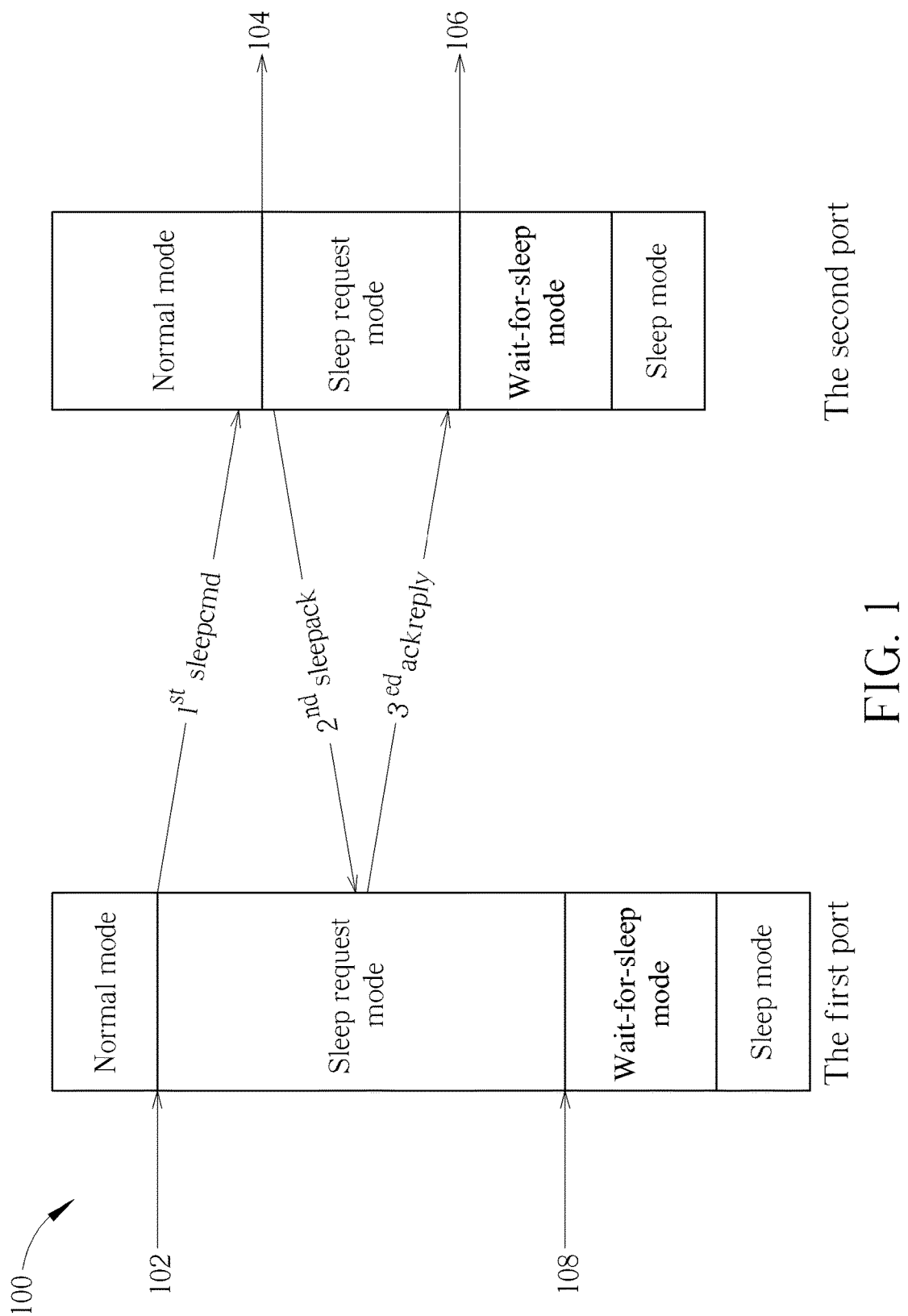
FIG. 1 is a diagram illustrating a three-way handshaking flow according to an embodiment of the present invention.

FIG. 1 is a diagram illustrating the three-way handshaking flow 100 according to an embodiment of the present invention, wherein the three-way handshaking flow 100 is applied in a product corresponding to automotive Ethernet standards (e.g. BR-PHY standard). This is not a limitation of the present invention, however, and the three-way handshaking flow 100 may be applied in an associated, similar or identical standard/protocol in other identical or similar fields. In this embodiment, the state flow on the left hand side is an operation flow of a first port being a sleep master; the state flow on the right hand side is a corresponding operation flow of a second port, which is a link partner of the first port and is a sleep slave. The sleep master can be the link master determined when the automotive Ethernet standard is connecting, or it can also be the link slave determined when the automotive Ethernet standard is connecting.

Specifically, the first port and the second port are both in a normal mode at the beginning. At a time point 102, the first port, as a sleep master, programs a first sleep command ($1^{st}$ sleepcmd) and sends it to the second port, and the first port enters into a sleep request mode. After the second port receives and decodes the first sleep command $1^{st}$ sleepcmd at a time point 104, if the second port defaults to be a non-automatic mode, the second port waits for an approval from a top-layer control unit to program a second sleep acknowledgement ($2^{nd}$ sleepack) and send it to the first port. Then, the second port also enters into the sleep request mode; if the second port default to an automatic mode, the second port programs the second sleep acknowledgement $2^{nd}$ sleepack and sends it to the first port without waiting for approval from the top-layer control unit (or there is no top-layer control unit). Then, the second port also enters into the sleep request mode.

After the first Port receives and decodes the second sleep acknowledgement $2^{nd}$ sleepack, if the first port defaults to be the non-automatic mode mentioned above, the first port waits for an approval from a top-layer control unit to program a third acknowledgement reply ($3^{rd}$ ackreply) and send it back to the second port; if the first port defaults to the automatic mode mentioned above, the first port programs the third acknowledgement reply $3^{rd}$ ackreply and sends it back to the second port without waiting for approval from the top-layer control unit (or there is no top-layer control unit). After receiving and decoding the third acknowledgement reply $3^{rd}$ ackreply at a time point 106, the second port goes through a wait-for-sleep mode then enters into a sleep mode, wherein the difference between the automatic mode and the non-automatic mode is similar to the difference mentioned above. It should be noted that, according to the automotive Ethernet standard, the main power (e.g. 3.3V power supply) will be cut off under the sleep mode and only depends on a battery for providing power.

The automatic mode mentioned above can perform the corresponding operation without an approval from a top-layer control unit, and therefore does not need a top-layer control unit to send commands to control the corresponding operation. In practice, the method can be implemented by using a command generating unit to replace the top-layer control unit (e.g. in a situation where there is no top-layer control unit) to generate the corresponding commands automatically, but this is not a limitation of the present invention.

Finally, because the second port starts to sleep at a time point 108, the first port immediately detects the connection fails by determining that, from the time point 108, no normal signal sent by the second port can be detected on the cable. The first port goes through a wait-for-sleep mode then enters into a sleep mode, wherein the difference between the automatic mode and the non-automatic mode is similar to that mentioned above.

Because the sleep master and the sleep slave are independent, they are not able to cut off the power at the same moment. In an example of a special case, the second port in the three-way handshaking flow 100 enters the wait-for-sleep mode at a time point 106 but the first port subsequently changes the decision (e.g. by stopping the second port from entering the sleep mode) so that this case cannot be recovered, the top-layer control unit is required to intervene.

Because the choice of being the sleep master or the sleep slave is not determined by negotiating, the one who commands the sleep request first is the sleep master, and the other is the sleep slave. In another situation, if both sides command the sleep request at the same or almost the same time, both sides are the sleep master. In this case, the flow cannot be a standard three-way handshaking flow, and is not guaranteed to enter the sleep mode. Therefore, the products corresponding to the automotive Ethernet standard applying the three-way handshaking flow 100 of the present invention use a shared timeline for the first port and the second port to allocate absolute time zones for the first port and the second port to send sleep requests. For example, the shared timeline is based on the time of the other of the ports which is obtained from decoding by a scrambler.

Figure 2:
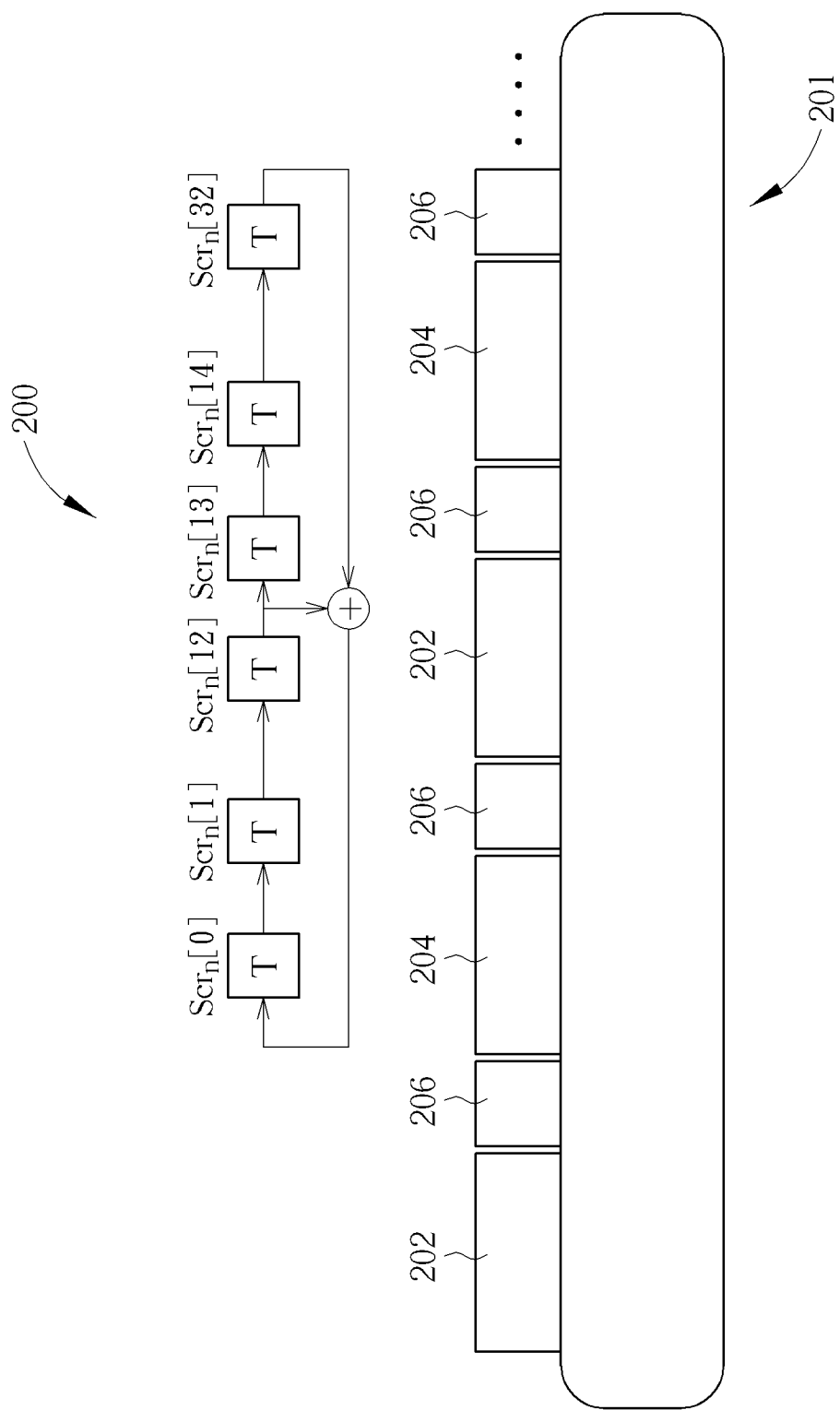
FIG. 2 is a diagram illustrating a shared timeline according to an embodiment of the present invention.

FIG. 2 is a diagram illustrating a shared timeline according to an embodiment of the present invention, wherein a scrambler 200 corresponds to the spec of the automotive Ethernet standard, and the scrambler 200 generates a shared timeline 201 whose cycle period is $2^{33}-1$ time units. The shared timeline 201 can be divided into three kinds of time zones, i.e. a plurality of time zones 202, a plurality of time zones 204, and a plurality of time zones 206, wherein the lengths of the time zones 202 and time zones 204 may be 1024 time units, and the length of time zones 206 may be 256 time units. In these three kinds of time zones, the first port can be restricted to only be the sleep master in the time zones 202; and the second port can be restricted to only be the sleep master in the time zones 204. The time zones 206 are arranged to compensate the time difference of the first port and the second port.

Figure 3:
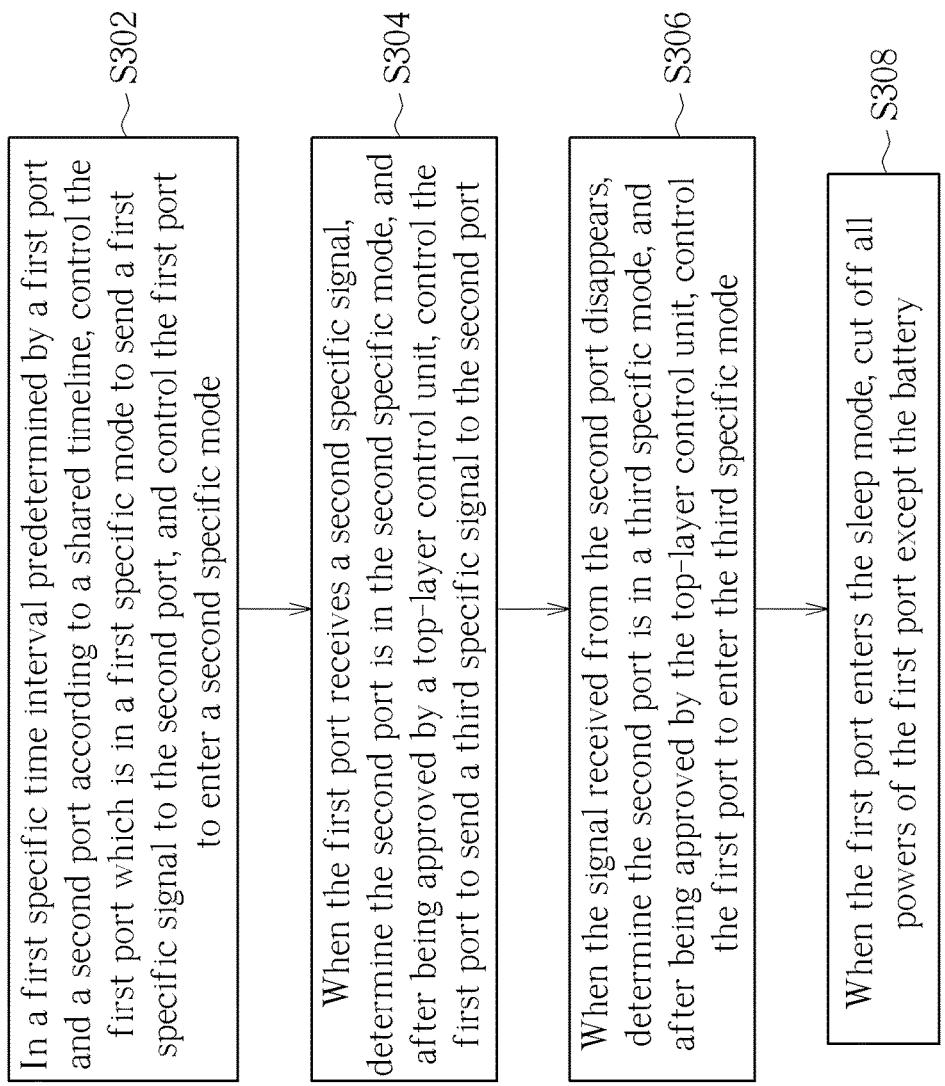
FIG. 3 is a flowchart illustrating a three-way handshaking method according to an exemplary of the present invention.

FIG. 3 is a flowchart illustrating a three-way handshaking method according to an exemplary of the present invention. Provided that the result is substantially the same, the steps are not required to be executed in the exact order in FIG. 3, and the steps are not required to be executed consecutively in FIG. 3; that is, other steps can be inserted into the flow. In addition, some steps in FIG. 3 can be omitted according to different embodiments or design requirements. The steps of the three-way handshaking method 300 are described as follows.

S302: in a first specific time interval predetermined by a first port and a second port according to a shared timeline, control the first port which is in a first specific mode to send a first specific signal to the second port, and control the first port to enter a second specific mode.

S304: when the first port receives a second specific signal, determine the second port is in the second specific mode, and after being approved by a top-layer control unit, control the first port to send a third specific signal to the second port.

S306: when the signal received from the second port disappears, determine the second port is in a third specific mode, and after being approved by the top-layer control unit, control the first port to enter the third specific mode.

S308: when the first port enters the sleep mode, cut off all powers of the first port except the battery.

Figure 4:
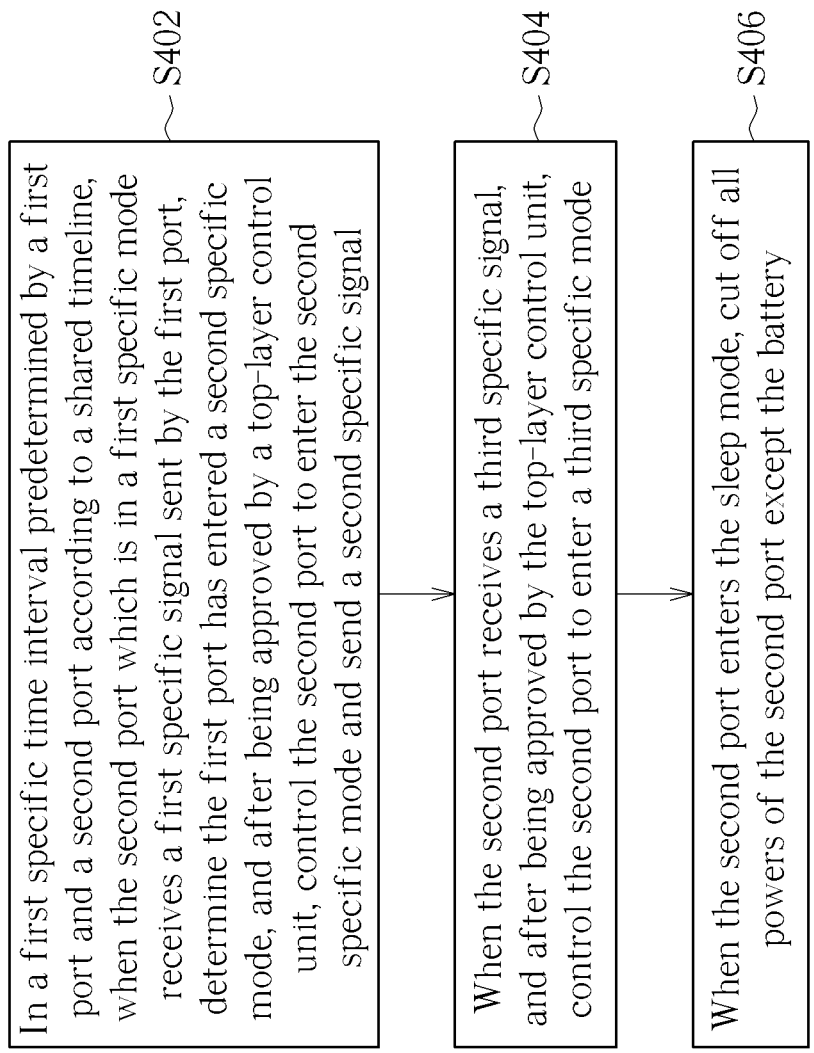
FIG. 4 is a flowchart illustrating a three-way handshaking method according to another exemplary of the present invention.

FIG. 4 is a flowchart illustrating a three-way handshaking method according to another exemplary of the present invention. Provided that the result is substantially the same, the steps are not required to be executed in the exact order in FIG. 4, and the steps are not required to be executed consecutively in FIG. 4; that is, other steps can be inserted into the flow. In addition, some steps in FIG. 4 can be omitted according to different embodiments or design requirements. The steps of the three-way handshaking method 400 are described as follows.

S402: in a first specific time interval predetermined by a first port and a second port according to a shared timeline, when the second port which is in a first specific mode receives a first specific signal sent by the first port, determine the first port has entered a second specific mode, and after being approved by a top-layer control unit, control the second port to enter the second specific mode and send a second specific signal.

S404: when the second port receives a third specific signal, and after being approved by the top-layer control unit, control the second port to enter a third specific mode.

S406: when the second port enters the sleep mode, cut off all powers of the second port except the battery.

The first port and the second port correspond to the automotive Ethernet standard, and steps S304, S402 and S404 do not need approval from the top-layer control unit.

Figure 5:
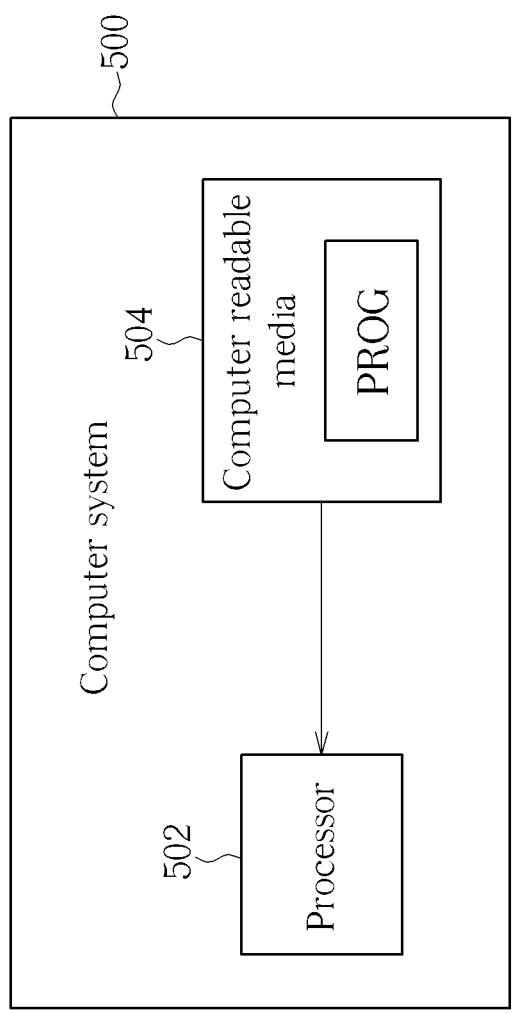
FIG. 5 is a diagram illustrating a computer system according to an embodiment of the present invention.

FIG. 5 is a diagram illustrating a computer system 500 according to an embodiment of the present invention, wherein the computer system 500 comprises a processor 502 and a computer readable media 504. For example, the computer system 500 can be a personal computer, and the computer readable media 504 can be any storage device which can have the function of storing data in a personal computer such as volatile memory, non-volatile memory, hard disk, CD, etc. In this embodiment, the computer readable medium 604 stores a code PROG. Therefore, when the code PROG is loaded and executed by the processor 502, the code PROG makes the processor 502 execute the steps S302 to S308/S402 to S406 shown in FIG. 3 and FIG. 4. One skilled in the art should understand the operation of the processor 502 executing the code PROG after reading the abovementioned paragraphs, and the detailed description is thus omitted here for brevity.

The above-described concept of the present invention can be implemented in any integrated circuit by semiconductors. For example, the present invention can be implemented in a single integrated circuit design, or a supplication-specific integrated circuit and/or any other subsystem.

The present invention can be implemented in any suitable form comprising hardware, software, firmware or any combination of these. At least part of the present invention can be selectively implemented to be computer software operated in one or a plurality of data processors and/or in a digital signal processor or configurable module element (e.g. FPGA). Therefore, the elements and components of the embodiments of the present invention can be physically, functionally and logically implemented in any suitable form. In practice, the function of the present invention can be implemented in a single unit, a plurality of units, or can be a part of other functional units.

Although the present invention is explained using particular embodiments, the present invention is not limited to the specific form described in the specification. The scope of the present invention is only limited by the claims. In addition, although the characteristics of the present invention are described by combining specific embodiments, one skilled in this art should understand that a variety of characteristics can be combined according to the present invention. In the claims, the technical term "comprise" does not exclude the existence of other elements or steps.

In addition, the order of the features in the claims does not mean a specific order that must be followed, and the order of steps in the method claims does not mean these steps must be followed in exactly this order. In addition, a single citing does not exclude plurality. Therefore, words like "a", "first", "second" do not exclude plurality.

The operating mode finite state machine of the present invention corresponds to the automotive Ethernet standard. With regards to the sleep mode, a flexible method is provided to further improve the power consumption issue of the automotive Ethernet standard.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A three-way handshaking method, comprising:
controlling a first port which is in a first specific mode to send a first specific signal to a second port, and controlling the first port to enter into a second specific mode after sending the first specific signal, wherein the first port and the second port correspond to the BR-PHY automotive Ethernet standard;
determining the second port is in the second specific mode when the first port receives a second specific signal, and controlling the first port to send a third specific signal to the second port; and
controlling the first port to enter into the third specific mode when determining the second port is in a third specific mode.

2. The three-way handshaking method of claim 1, wherein the third specific mode comprises a wait-for-sleep mode and a sleep mode, and the method further comprises:
cutting all powers of the first port off except for a battery when the first port enters into the sleep mode.

3. The three-way handshaking method of claim 1, wherein the step of controlling the first port to enter into the third specific mode when determining the second port is in a third specific mode comprises:
determining the second port is in the third specific mode when a signal received from the second port disappears, and controlling the first port to enter into the third specific mode.

4. The three-way handshaking method of claim 1, wherein the steps of determining the second port is in the second specific mode when the first port receives the second specific signal, and controlling the first port to send the third specific signal to the second port comprise:
determining the second port is in the second specific mode when the first port receives the second specific signal, and after being approved by a top-layer control unit, controlling the first port to send the third specific signal to the second port.

5. The three-way handshaking method of claim 1, wherein the step of controlling the first port to enter into the third specific mode when determining the second port is in the third specific mode comprises:
when determining the second port is in the third specific mode, and after being approved by a top-layer control unit, controlling the first port to enter into the third specific mode.

6. The three-way handshaking method of claim 1, wherein the steps of controlling the first port which is in the first specific mode to send the first specific signal to the second port, and controlling the first port to enter into the second specific mode comprise:
in a first specific time interval, controlling the first port which is in the first specific mode to send the first specific signal to the second port and controlling the first port to enter into the second specific mode.

7. The three-way handshaking method of claim 6, wherein the first specific time interval is predetermined by the first port and the second port according to a shared timeline.

8. A three-way handshaking method, comprising:
when a second port which is in a first specific mode receives a first specific signal sent by a first port, determining the first port has entered into a second specific mode, and controlling the second port to enter into the second specific mode and sending a second specific signal, wherein the first port and the second port correspond to the BR-PHY automotive Ethernet standard; and when the second port receives a third specific signal, controlling the second port to enter into a third specific mode.

9. The three-way handshaking method of claim 8, wherein the third specific mode comprises a wait-for-sleep mode and a sleep mode, and the method further comprises:

cutting all powers of the second port off except for a battery when the second port enters into the sleep mode.

10. The three-way handshaking method of claim 8, wherein the steps of determining the first port has entered into the second specific mode, and controlling the second port to enter into the second specific mode and sending the second specific signal comprise:

when the second port which is in the first specific mode receives the first specific signal sent by the first port, determining the first port has entered into the second specific mode, and after being approved by a top-layer control unit, controlling the second port to enter into the second specific mode and send the second specific signal.

11. The three-way handshaking method of claim 8, wherein the step of controlling the second port to enter into a third specific mode comprises:

when the second port receives the third specific signal, and after being approved by a top-layer control unit, controlling the second port to enter into the third specific mode.

12. The three-way handshaking method of claim 8, wherein the steps of determining the first port has entered into the second specific mode, and controlling the second port to enter into the second specific mode and send the second specific signal comprise:

in a first specific time interval, when the second port which is in the first specific mode receives the first specific signal sent by the first port, determining the first port has entered into the second specific mode, and controlling the second port to enter into the second specific mode and send the second specific signal.

13. The three-way handshaking method of claim 12, wherein the first specific time interval is predetermined by the first port and the second port according to a shared timeline.

14. A computer readable media, storing a code, wherein the following steps are executed when the code is executed by a processor:

controlling a first port which is in a first specific mode to send a first specific signal to a second port, and controlling the first port to enter into a second specific mode after sending the first specific signal, wherein the first port and the second port correspond to the BR-PHY automotive Ethernet standard;

when the first port receives a second specific signal, determining the second port is in the second specific mode, and controlling the first port to send a third specific signal to the second port; and controlling the first port to enter into the third specific mode when determining the second port is in a third specific mode.

15. The computer readable media of claim 14, wherein the third specific mode comprises a wait-for-sleep mode and a sleep mode, and the following steps are further executed when the code is executed by a processor:

cutting all powers of the first port except for a battery when the first port enters into the sleep mode.

* * * * *